United States Patent
Foo

(10) Patent No.: US 7,262,714 B2
(45) Date of Patent: Aug. 28, 2007

(54) INTERPOLATING ENCODER UTILIZING A FREQUENCY MULTIPLIER

(75) Inventor: Siang Leong Foo, Penang (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/292,961

(22) Filed: Dec. 1, 2005

(65) Prior Publication Data

US 2007/0126607 A1    Jun. 7, 2007

(51) Int. Cl.
*H03M 1/22* (2006.01)

(52) U.S. Cl. ...................................... 341/13

(58) Field of Classification Search ........... 341/11, 341/13, 9, 5
See application file for complete search history.

(56) References Cited

U.S. PATENT DOCUMENTS

| | | | | |
|---|---|---|---|---|
| 4,015,129 A * | 3/1977 | Manring | .......... | 378/4 |
| 4,359,688 A | 11/1982 | Haville | .......... | 327/120 |
| 4,445,112 A * | 4/1984 | Haville | .......... | 341/9 |
| 4,737,721 A | 4/1988 | Lippl | .......... | 327/116 |
| 5,644,514 A | 7/1997 | Abo et al. | .......... | 702/124 |
| 6,172,359 B1 * | 1/2001 | Stridsberg | .......... | 250/231.13 |
| 6,396,318 B2 * | 5/2002 | Saeki | .......... | 327/116 |
| 2005/0238365 A1 * | 10/2005 | Tan et al. | .......... | 398/183 |

FOREIGN PATENT DOCUMENTS

GB    2233521    1/1991

OTHER PUBLICATIONS

Search Report dated Mar. 1, 2007 for the Patent Application In Great Britain No. 0623879.4.

* cited by examiner

*Primary Examiner*—Peguy JeanPierre

(57) ABSTRACT

An encoder having a detector and an optical system that generates an image of a code strip on the detector is disclosed. The image includes a plurality of light and dark stripes, the detector generating a plurality of sinusoidal signals differing in phase from one another as the code strip moves relative to the detector. Each sinusoidal signal cycles through one period when the code strip moves a distance equal to one light stripe and one dark stripe with respect to the detector. A frequency multiplier generates a plurality of frequency multiplied signals. The encoder utilizes a signal interpolator that defines a plurality of position locations utilizing the frequency multiplied signals, there being at least 5 such points corresponding to the code strip moving a distance equal to one light stripe and one dark stripe with respect to the detector.

5 Claims, 4 Drawing Sheets

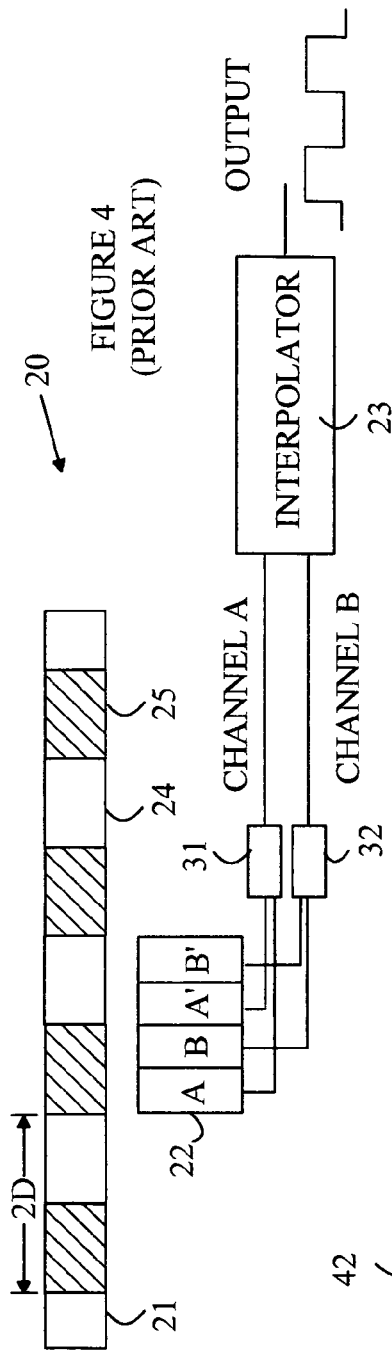
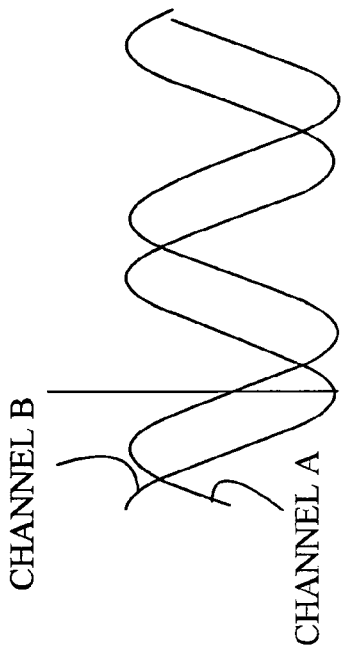
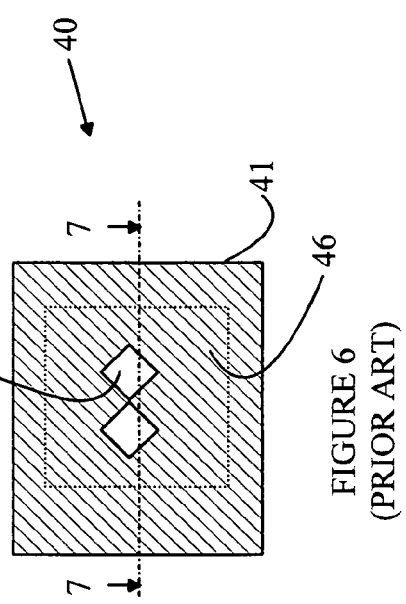
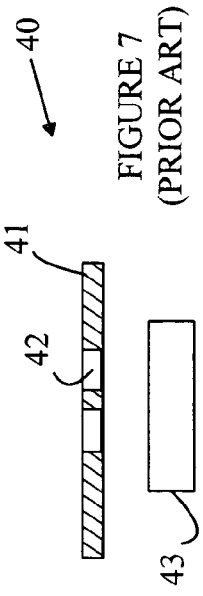
FIGURE 4 (PRIOR ART)
FIGURE 5 (PRIOR ART)
FIGURE 6 (PRIOR ART)
FIGURE 7 (PRIOR ART)

INTERPOLATING ENCODER UTILIZING A FREQUENCY MULTIPLIER

BACKGROUND OF THE INVENTION

Encoders provide a measurement of the position of a component in a system relative to some predetermined reference point. Encoders are typically used to provide a closed-loop feedback system to a motor or other actuator. For example, a shaft encoder outputs a digital signal that indicates the position of the rotating shaft relative to some known reference position that is not moving. A linear encoder measures the distance between the present position of a moveable carriage and a reference position that is fixed with respect to the moveable carriage as the moveable carriage moves along a predetermined path.

An absolute shaft encoder typically utilizes a plurality of tracks on a disk that is connected to the shaft. Each track consists of a series of dark and light stripes that are viewed by a detector that outputs a value of digital 1 or 0, depending on whether the area viewed by the detector is light or dark. An N-bit binary encoder typically utilizes N such tracks, one per bit. An incremental encoder typically utilizes a single track that is viewed by a detector that determines the direction and the number of stripes that pass by the detector. The position is determined by incrementing and decrementing a counter as each stripe passes the detector.

In both types of encoder, the ultimate resolution is determined by the stripe pattern and the size of the detectors used to view the stripe pattern. To provide increased resolution, the density of the stripes must be increased. For example, in a shaft encoder, the number of stripes per degree of rotation must be increased. Similarly, in a linear encoder, the number of stripes between the limits of the linear motion must be increased. However, there is a practical limit to the density of stripes that is set by optical and cost constraints.

One method for providing increased resolution is to utilize an interpolation scheme to provide an estimate of the relative position of the code strip and the photodetectors between the points at which the edges of the stripes are detected. In one scheme, the light from a track is viewed by two sets of detectors. The shape and position of the detectors is set to provide two sinusoidal signals that are 90 degrees out of phase. By measuring the points at which two signals based on these sinusoids cross, intermediate position measurements can be provided. The accuracy of the determination of the intermediate points depends on the frequency of the sinusoids, which, in turn, is set by the number of stripes in the code strip or disk. Hence, this type of system can only extend the resolution by a limited amount.

SUMMARY OF THE INVENTION

The present invention includes an encoder having a detector and an optical system that generates an image of a code strip on the detector. The image includes a plurality of light and dark stripes, the detector generating a plurality of sinusoidal signals differing in phase from one another as the code strip moves relative to the detector. Each sinusoidal signal cycling through one period when the code strip moves a distance equal to one light stripe and one dark stripe with respect to the detector. The encoder includes a frequency multiplier that generates a plurality of frequency multiplied signals, each frequency multiplied signal corresponding to one of the sinusoidal signals and having a frequency that is an integer multiple of that corresponding sinusoidal signal. The encoder utilizes a signal interpolator that defines a plurality of position locations utilizing the frequency multiplied signals, there being at least 5 such points corresponding to the code strip moving a distance equal to one light stripe and one dark stripe with respect to the detector. The signal interpolator can generate a signal that has a first state and a second state and wherein the signal changes states each time one of the frequency multiplied signals passes through a predetermined value.

BRIEF DESCRIPTION OF THE DRAWINGS

FIG. 4 illustrates a 2-channel encoder that utilizes sinusoidal interpolation.
FIG. 5 illustrates the combined A and A' signals that provide a channel A signal which is a sinusoid.
FIG. 6 is a top view of photodetector 40.
FIG. 7 is a cross-sectional view of photodetector 40 through line 7—7 shown in FIG. 6.

DETAILED DESCRIPTION OF THE PREFERRED EMBODIMENTS OF THE INVENTION

Figure 1:
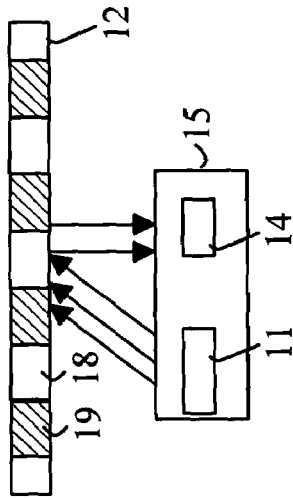
FIG. 1 illustrates a transmissive encoder.
Figure 2:
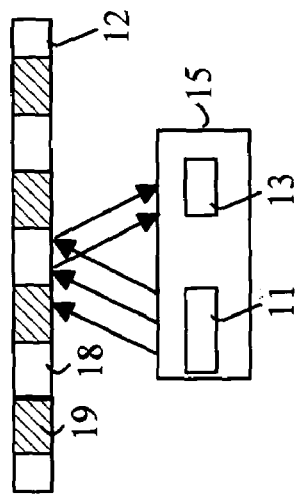
FIG. 2 illustrates a reflective encoder.
Figure 3:
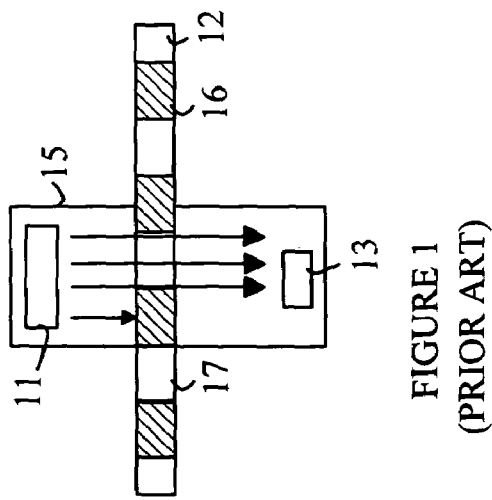
FIG. 3 illustrates an imaging encoder.

Refer now to FIGS. 1–3, which illustrate some typical encoder designs. The encoder can be divided into an emitter/detector module 15 and a code wheel or code strip. Module 15 includes an emitter 11 that illuminates a portion of the code strip 12. The illuminated code strip is viewed by a detector 13. The emitter typically utilizes an LED as the light source. The detector is typically based on one or more photodiodes. FIG. 1 illustrates a transmissive encoder. In transmissive encoders, the light from the emitter is collimated into a parallel beam by a collimating optic such as a lens that is part of the emitter. Code strip 12 includes opaque stripes 16 and transparent stripes 17. When code strip 12 moves between emitter 11 and detector 13, the light beam is interrupted by the opaque stripes on the code strip. The photodiodes in the detector receive flashes of light. The resultant signal is then used to generate a logic signal that transitions between logical one and logical zero.

FIG. 2 illustrates a reflective encoder. In reflective encoders, the code strip includes reflective stripes 18 and absorptive stripes 19. Again, the emitter includes a collimating optic such as a lens. The light from the emitter is reflected or absorbed by the stripes on the code strip. The reflected light is imaged onto the photodiodes in the detector. The output from the photodetectors is again converted to a logic signal.

FIG. 3 illustrates an imaging encoder. An imaging encoder operates essentially the same as the reflective encoder described above, except that module 15 includes imaging optics that form an image of the illuminated code strip on the detector 14.

In each of these types of encoders, an image of one portion of the stripe pattern is generated on the photosensitive area of a photodiode in an array of photodiodes. To simplify the following discussion, drawings depicting the image of the code strip and the surface area of the photodetectors on which the image is formed will be utilized. In each drawing, the image of the code strip will be shown next to the photodiode array to simplify the drawing. However, it is to be understood that in practice, the image of the code strip would be projected onto the surface of the photodiode array. In addition, to further simplify the drawings, the light source and any collimating or imaging optics are omitted from the drawings.

Refer now to FIGS. 4 and 5, which illustrate a 2-channel encoder that utilizes sinusoidal interpolation. Interpolator 20 includes a code strip that projects an image 21 onto an array of photodiodes 22. The image has alternating bright and dark bands as shown at 24 and 25, respectively. The array of photodiodes includes 4 photodiodes labeled A, B, A', B'. The A' and B' photodiodes are displaced from the A and B photodiodes, respectively, by a distance such that these photodiodes generate the complement of the signals from the A and B photodiodes, respectively. The A and B photodiodes are displaced from one another by an amount that results in the B photodiode signal being 90 degrees out of phase with respect to the A photodiode signal.

The A and A' signals are combined to provide a channel A signal by circuit 31 which is a sinusoid as shown in FIG. 5. Similarly, the B and B' signals are combined by circuit 32 to provide a channel B signal, which is a sinusoid that is 90 degrees out of phase with respect to the channel A signal. In one direction of travel, the channel A signal will lead the channel B signal. In the other direction of travel, the channel B signal will lead the channel A signal. Hence, by observing the relationship between these two signals, the direction of travel can be determined.

The two channel signals are combined by an interpolator 23 to generate an output signal that is a square wave having a period less than that of the code strip image. That is, the output signal will go through more than one cycle when a 2D portion of the code strip image passes one of the photodiodes. The period of the output signal depends on the particular algorithm used by interpolator 23. Since these algorithms are well known to the art, and are not central to an understanding of the present invention, these algorithms will not be discussed in detail here. For the purposes of the present discussion, it is sufficient to note that a number of intermediate points within a 2D cycle can be defined by determining the points at which one of the sinusoids crosses a curve generated by multiplying the other sinusoid by an integer.

As noted above, each of the photodiodes generates an output signal that is a sinusoid. Refer now to FIGS. 6 and 7, which illustrate a photodetector that provides such a signal. FIG. 6 is a top view of photodetector 40, and FIG. 7 is a cross-sectional view of photodetector 40 through line 7—7 shown in FIG. 6. Photodetector 40 is constructed from a photodiode 43 having an active area 46 and a screen 41 having one or more openings therein. An exemplary opening is shown at 42. The photodiode generates an output signal that is proportional to the amount of light that is incident on the photodiode. As the code strip image moves past the photodiode at a constant speed, a light pattern moves over the openings. It is assumed that the intensity of light within a bright band remains constant as the light pattern moves across the opening. The shape of the opening is determined such that the light intensity as a function of time is a sinusoid.

Figure 8:
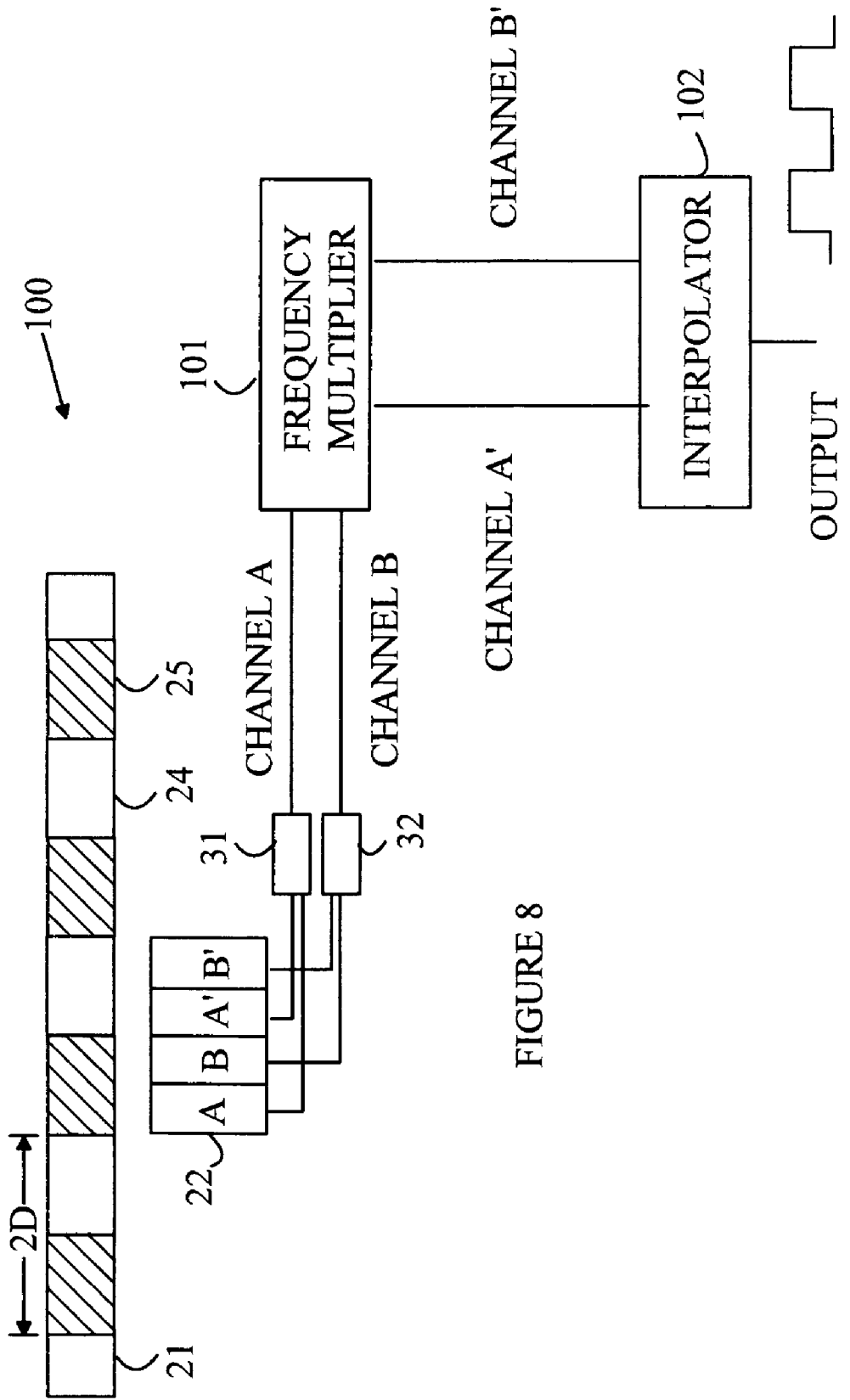
FIG. 8 illustrates an encoder 100 according to one embodiment of the present invention.

The present invention utilizes the channel A and channel B signals to generate a new pair of signals that are sinusoids of a higher frequency. The higher frequency signals can then be used with or without further interpolation to provide a higher level of resolution than would be obtained from the original channel A and channel B signals. Refer now to FIG. 8, which illustrates an encoder 100 according to one embodiment of the present invention. To simplify the following discussions, those elements of encoder 100 that serve functions analogous to elements discussed above with reference to FIG. 4 have been given the same numeric designations and will not be discussed in detail here.

Encoder 100 utilizes a frequency multiplying circuit 101 to convert the sinusoidal channel A and channel B signals discussed above to two new signals, channel A' and channel B' that have a frequency that is a multiple of the channel A and channel B signals. These frequency multiplied signals are then input to an interpolator circuit 102 to provide the final output signal. For the purposes of this discussion, it will be assumed that channel A=$\sin(\theta)$ and channel B=$\cos(\theta)$. The present invention is based on the observation that $\cos(\theta)$ and $\sin(\theta)$ can be computed from $\sin(\theta)$ and $\cos(\theta)$. For example $\sin(2\theta)=2 \sin(\theta)\cos(\theta)$ and $\cos(2\theta)=\cos^2(\theta)-\sin^2(\theta)$.

Similarly, $\sin(3\theta)=3 \sin(\theta)-4 \sin^3(\theta)$ and $\cos(3\theta)=4 \cos^3(\theta)-3 \cos(\theta)$.

Higher order multiples of these signals can be computed either by using the original signals or by multiplying and adding various combinations of the $\cos(2\theta)$, $\sin(2\theta)$, $\cos(\theta)$, $\sin(\theta)$, etc. The computations can be carried out using either analog or digital circuitry. Analog circuits that multiply two signals together and that add two signals are well known in the art, and hence, will not be discussed in detail here. For inexpensive encoders, analog circuitry is preferred.

In principle, any interpolation algorithm that could have been used with the original channel A and channel B signals can be used with the new channel A' and channel B' signals. The simplest form of interpolation measures the points at which either the channel A' or channel B' signals pass through zero. In this case, the output signal is toggled between 0 and 1 each time either of the signals passes through zero. Prior to the frequency multiplication, there were 4 such points during the period in which the code strip moved a distance 2D.

Hence, when signals generated by doubling the frequency are utilized, 8 such points can be defined, providing an additional factor of two in the resolution relative to systems that utilize just the original channel A and channel B signal. Similarly, if the new signals are generated by multiplying the original frequency by a factor of 3, 12 such points can be defined when the code strip moves through a distance of 2D.

Figure 9:
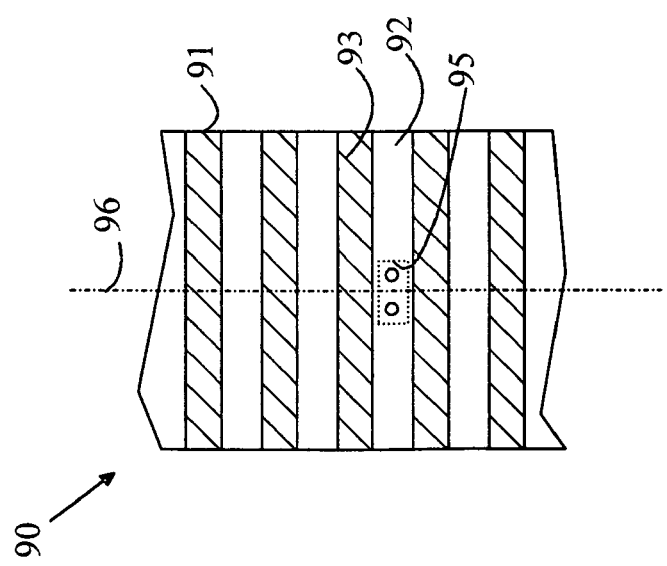
FIG. 9 is a top view of a portion of a linear encoder 90.

The above-described embodiments utilize code strips to modulate the light from the emitter detector module. The term code strip is normally used to refer to a linear encoder, i.e., a series of alternating rectangular stripes along a line that are used to measure the linear displacement of one component relative to another. Refer now to FIG. 9, which is a top view of a portion of a linear encoder 90 having a code strip 91 that includes reflective and absorptive stripes 92 and 93, respectively, arranged along a line 96. An emitter detector module 95 is placed under a section of the code strip. The code strip moves with respect to emitter detector module 95 in a direction parallel to line 96. The emitter detector module includes a number of photodetectors of the form discussed above. Each photodetector includes a window and a photodiode that generates a sinusoidal signal when the code strip pattern moves relative to the detector. The number of photodiodes will depend on the number of channels implemented in the detector.

Figure 10:
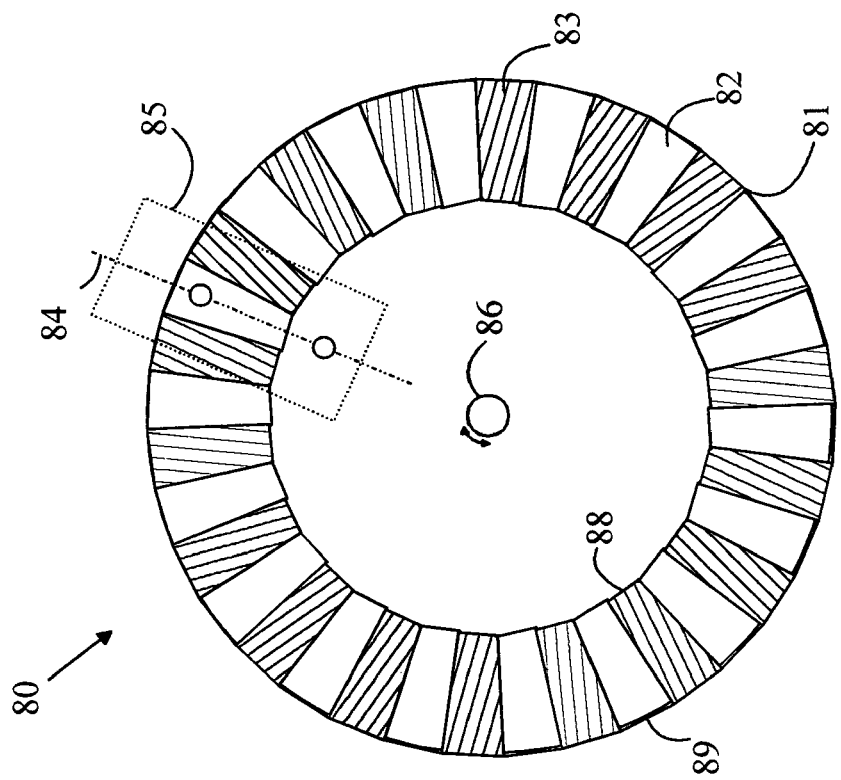
FIG. 10 is a top view of an encoder 80 according to another embodiment of the present invention.

However, it will be appreciated that a shaft encoder that utilizes a code disk to measure the angular displacement of the shaft relative to a fixed position can also be constructed utilizing the teaching of the present invention. Refer now to FIG. 10, which is a top view of an encoder 80 according to another embodiment of the present invention. Encoder 80 encodes the angular position of shaft 86. Encoder 80 is similar to the encoders discussed above in that an emitter detector module 85 illuminates a code pattern and measures the light reflected by the reflective portions of the code pattern. The code strip discussed above is replaced by a code disk 81, which includes alternating truncated pie shaped sectors 82 and 83 along a circle that has a center coincident with that of shaft 86. Each sector is defined by two radii of a circle 89 having its center at the center of shaft 86 and circles 88 and 89. The photodetector includes code windows that are aligned on radii of the circle such that the photodiodes generate sinusoidal signals that are displaced in phase with one another. The light source and photodetector of emitter detector module 85 are aligned on a radius 84 of circle 89. To simplify the terminology used herein, the term "code strip" is defined to include both linear code strips and circular code disks.

The embodiments described above utilize two sinusoidal signals that are 90 degrees out of phase. However, embodiments that utilize different numbers of sinusoidal signals can also be constructed. For example, the encoder could utilize three detectors that generate three sinusoidal signals that are 60 degrees out of phase. These signals would then be combined to provide the frequency multiplied signals.

Various modifications to the present invention will become apparent to those skilled in the art from the foregoing description and accompanying drawings. Accordingly, the present invention is to be limited solely by the scope of the following claims.

What is claimed is:

1. An encoder comprising:
   a detector;
   an optical system for generating an image of a code strip on said detector, said image comprising a plurality of light and dark stripes, said detector generating a plurality of sinusoidal signals differing in phase from one another as said code strip moves relative to said detector, each sinusoidal signal cycling through one period and only one period when said code strip moves a distance equal to one light stripe and one dark stripe with respect to said detector, wherein said detector generates said plurality of sinusoidal signals from said image of said light and dark stripes as said image moves over said detector;
   a frequency multiplier that generates a plurality of frequency multiplied signals, each frequency multiplied signal corresponding to one of said sinusoidal signals and having a frequency that is an integer multiple of that corresponding sinusoidal signal, said integer multiple being greater than 1; and
   a signal interpolator that defines a plurality of position locations utilizing said frequency multiplied signals, there being at least 5 said position locations corresponding to said code strip moving a distance equal to one light stripe and one dark stripe with respect to said detector.

2. The encoder of claim 1 wherein said detector generates said sinusoidal functions 90 degrees out of phase.

3. The encoder of claim 2 wherein said integer multiple is an integer multiple of two.

4. The encoder of claim 1 wherein said signal interpolator generates a signal that has a first state and a second state and wherein said signal changes states each time one of said frequency multiplied signals passes through a predetermined value.

5. The encoder of claim 1 wherein said detector comprises a plurality of photodetectors.

* * * * *